(12) United States Patent
Sun

(10) Patent No.: US 9,575,654 B2
(45) Date of Patent: Feb. 21, 2017

(54) TOUCH DEVICE AND CONTROL METHOD THEREOF

(71) Applicant: Wistron Corporation, New Taipei (TW)

(72) Inventor: Rong-Cheng Sun, New Taipei (TW)

(73) Assignee: Wistron Corporation, New Taipei (TW)

( * ) Notice: Subject to any disclaimer, the term of this patent is extended or adjusted under 35 U.S.C. 154(b) by 198 days.

(21) Appl. No.: 14/218,997

(22) Filed: Mar. 19, 2014

(65) Prior Publication Data

US 2015/0149968 A1    May 28, 2015

(30) Foreign Application Priority Data

Nov. 27, 2013  (TW) .............................. 102143236 A

(51) Int. Cl.
*G06F 3/0488* (2013.01)
*G06F 3/038* (2013.01)

(52) U.S. Cl.
CPC ........... *G06F 3/04883* (2013.01); *G06F 3/038* (2013.01)

(58) Field of Classification Search
CPC .................................................... G06F 3/0488
See application file for complete search history.

(56) References Cited

U.S. PATENT DOCUMENTS

| 5,694,150 A * | 12/1997 | Sigona | G06F 3/038 715/856 |
| 7,623,119 B2 * | 11/2009 | Autio | G06F 3/04883 345/173 |
| 2007/0150842 A1 * | 6/2007 | Chaudhri | G06F 3/04883 715/863 |
| 2010/0083108 A1 * | 4/2010 | Rider | G06F 3/04886 715/702 |
| 2010/0188342 A1 * | 7/2010 | Dunn | G06F 3/04886 345/173 |
| 2010/0188432 A1 * | 7/2010 | Tsai | G06F 3/017 345/684 |

(Continued)

FOREIGN PATENT DOCUMENTS

| TW | 201248463 | 12/2012 |
| TW | 201337721 | 9/2013 |

OTHER PUBLICATIONS

"Office Action of Taiwan Counterpart Application," issued on Oct. 23, 2015, with English translation thereof, p. 1-p. 14.

*Primary Examiner* — David Choi
(74) *Attorney, Agent, or Firm* — Jianq Chyun IP Office

(57) ABSTRACT

A touch device and a control method thereof are provided. In the control method, a sensing signal generated by a sensor is received. When an operating object is present, a touch screen is configured for touchable regions and untouchable regions, wherein the untouchable regions cannot generate a response through a touch by the operating object. A gesture is received on the untouchable regions of the touch screen, a processor determines whether the gesture is conformed to a default gesture setting, and the processor decides whether or not to adjust part or all of the untouchable regions to the touchable regions according to the determining result. Accordingly, the touch device and the control method thereof of the embodiments of the invention can prevent or lower the occurrence of an accidental touch by a user and enhance the operating convenience of the user.

22 Claims, 8 Drawing Sheets

(56) References Cited

U.S. PATENT DOCUMENTS

| | | | |
|---|---|---|---|
| 2012/0038571 A1* | 2/2012 | Susani | G06F 3/0416 |
| | | | 345/173 |
| 2012/0256849 A1* | 10/2012 | Crumly | G06F 3/04883 |
| | | | 345/173 |
| 2012/0262407 A1* | 10/2012 | Hinckley | G06F 3/038 |
| | | | 345/173 |
| 2013/0055143 A1* | 2/2013 | Martin | G06F 3/0425 |
| | | | 715/779 |
| 2013/0239058 A1* | 9/2013 | Yao | G06F 3/04847 |
| | | | 715/833 |
| 2013/0239069 A1* | 9/2013 | Jeong | G06F 3/04883 |
| | | | 715/863 |
| 2013/0307801 A1* | 11/2013 | Nam | G06F 3/041 |
| | | | 345/173 |
| 2013/0314335 A1* | 11/2013 | Kang | G06F 3/0416 |
| | | | 345/173 |
| 2014/0068498 A1* | 3/2014 | Olsen | G06F 11/32 |
| | | | 715/781 |
| 2014/0096074 A1* | 4/2014 | Dojo | G06F 3/0488 |
| | | | 715/788 |
| 2014/0125615 A1* | 5/2014 | Sato | G06F 3/0488 |
| | | | 345/173 |
| 2014/0189551 A1* | 7/2014 | Kim | G06F 3/04817 |
| | | | 715/765 |
| 2014/0282228 A1* | 9/2014 | Pelissier | G06F 3/0488 |
| | | | 715/788 |
| 2015/0149968 A1* | 5/2015 | Sun | G06F 3/04883 |
| | | | 715/863 |

* cited by examiner

TOUCH DEVICE AND CONTROL METHOD THEREOF

CROSS-REFERENCE TO RELATED APPLICATION

This application claims the priority benefit of Taiwan application serial no. 102143236, filed on Nov. 27, 2013. The entirety of the above-mentioned patent application is hereby incorporated by reference herein and made a part of this specification.

BACKGROUND OF THE INVENTION

Field of the Invention

The invention relates to an electronic device and a control method thereof, and more particularly, to a touch device and a control method thereof capable of preventing an accidental touch during operation.

Description of Related Art

With the progress and development of touch technology, the touch device has gradually become a basic accessory in the electronic device such as a notebook computer, a mobile phone, a tablet computer, or a portable multimedia player. The touch device has also replaced conventional keyboards or physical buttons and has become a development trend of the next generation of input devices. Moreover, for aesthetic needs, the display panel of the above electronic devices generally aims for a larger display area. As a result, the above electronic devices have gradually been developed toward a slim border design.

However, in the current technique, when a display panel having a slim border is used with a touch device, the occurrence of an accidental touch by a user often occurs. To prevent an accidental touch, the user may need to change his normal operating posture, causing inconvenience to the user. Therefore, a technique is needed to allow convenient operation to the user and prevent an accidental touch by the user when holding a display panel meeting the aesthetic need of a slim border.

SUMMARY OF THE INVENTION

The invention provides a touch device and a control method thereof. The touch device and the control method allow convenient operation for a user and prevent an accidental touch by the user when holding the touch device. The operating needs of the user are thus met.

The invention provides a control method of a touch device. The touch device includes a touch screen and a sensor. The control method includes the following steps. A sensing signal generated by the sensor is received to detect whether an operating object is present. When an operating object is present, the touch screen is configured for touchable regions and untouchable regions, wherein the untouchable regions cannot generate a response through a touch by the operating object. Moreover, a gesture is received on the untouchable regions, whether the gesture is conformed to a default gesture setting is determined, and whether or not to adjust part or all of the untouchable regions to the touchable regions is decided according to the determining result.

In an embodiment of the invention, the default gesture setting includes default gestures, and an execution time and an area of the untouchable regions touched by the operating object corresponding to each of the default gestures. Moreover, determining whether the gesture is conformed to the default gesture setting includes the following steps. Whether the gesture is conformed to the default gestures and the execution time and the area corresponding to each of the default gestures thereof is determined. Moreover, whether to adjust part or all of the untouchable regions corresponding to a first location of the gesture to the touchable regions is decided according to the first location.

In an embodiment of the invention, the default gestures include a successive tapping gesture. Determining whether the gesture is conformed to the default gestures and the execution time and the area corresponding to each of the default gestures thereof includes the following steps. Whether the gesture is conformed to a number of successive tapping of the successive tapping gesture and the execution time and the area corresponding to the successive tapping gesture is determined.

In an embodiment of the invention, the default gestures include a long press gesture. Determining whether the gesture is conformed to the default gestures and the execution time and the area corresponding to each of the default gestures thereof includes the following steps. Whether the gesture is conformed to the long press operation and the execution time and the area corresponding to the long press gesture is determined.

In an embodiment of the invention, the default gesture setting includes a sliding operation and a movement direction and a distance of the sliding operation, and determining whether the gesture is conformed to the default gesture setting to decide whether or not to adjust part or all of the untouchable regions to the touchable regions includes the following steps. Whether the gesture is conformed to the sliding operation and the movement direction and the distance of the sliding operation is determined. Whether to adjust part or all of the untouchable regions to the touchable regions according to the movement direction and the distance of the gesture is decided.

In an embodiment of the invention, determining whether the gesture is conformed to the default gesture setting to decide whether or not to adjust part or all of the untouchable regions to the touchable regions includes the following steps. The untouchable regions are configured for a plurality of subregions. A second location touched by the gesture is detected. Moreover, one of the subregions corresponding to the second location is adjusted to the touchable regions.

In an embodiment of the invention, after whether or not to adjust part or all of the untouchable regions to the touchable regions is decided, the following steps are further included. Whether to open a program is determined. Part or all of the subregions corresponding to the program are adjusted to the touchable regions according to the program.

In an embodiment of the invention, determining whether the gesture is conformed to the default gesture setting further includes the following steps. When the gesture is not conformed to the default gesture setting, the untouchable regions do not respond to the gesture.

In an embodiment of the invention, configuring the touch screen for touchable regions and untouchable regions when an operating object is present includes the following steps. The capacitance threshold of the untouchable regions in the touch device is increased.

In an embodiment of the invention, configuring the touch screen for touchable regions and untouchable regions when an operating object is present includes the following steps. The untouchable regions are adjusted to one of one side adjacent to the touchable regions, one half of a circumference, and a circumference.

In an embodiment of the invention, determining whether the gesture is conformed to the default gesture setting to decide whether or not to adjust part or all of the untouchable regions to the touchable regions further includes the following steps. A prompt message is generated on the touch screen to confirm whether or not to adjust part or all of the untouchable regions to the touchable regions.

In another aspect, the invention provides a touch device including a sensor, a touch screen, and a processor. The sensor is used for detecting whether an operating object is present. The processor is coupled to the sensor and the touch screen and receives a sensing signal generated by the sensor. When an operating object is present, the touch screen is configured for touchable regions and untouchable regions, wherein the untouchable regions cannot generate a response through a touch by the operating object. A gesture is received on the untouchable regions of the touch screen, a processor determines whether the gesture is conformed to a default gesture setting, and the processor decides whether or not to adjust part or all of the untouchable regions to the touchable regions according to the determining result.

In an embodiment of the invention, the processor increases the capacitance threshold of the untouchable regions on the touch screen.

In an embodiment of the invention, the processor adjusts the untouchable regions to one of one side adjacent to the touchable regions, one half of a circumference, and a circumference.

In an embodiment of the invention, the processor further generates a prompt message on the touch screen to confirm whether or not to adjust part or all of the untouchable regions to the touchable regions.

Based on the above, in the touch device and the control method thereof of the embodiments of the invention, an operating object is detected through a sensor, a touch screen is configured for touchable regions and untouchable regions according to the detecting result, and whether to adjust the untouchable regions to the touchable regions is determined according to the gesture received. Accordingly, the touch device of the embodiments of the invention can adjust the touchable regions and the untouchable regions according to the operating condition of the user to reduce the chances of an accidental touch by the user and enhance the operating experience of the user.

To make the above features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

To provide convenient touch operation and prevent a user from accidentally touching a touch screen, the embodiments of the invention provide a touch device and a control method thereof. A sensor in the touch device determines whether an operating object such as a finger of a user or a stylus touches the touch device, and when the operating object touches the touch device, the touch device configures the touch screen for untouchable regions and touchable regions according to the detecting result and decides whether to adjust the untouchable regions according to a successive tapping, a long press, or a sliding gesture received. As a result, when the user operates an electronic device having a touch screen (especially an electronic device having a touch screen with a slim border), the user can prevent or lower the occurrence of an accidental touch due to operation through the embodiments of the invention.

Figure 1:
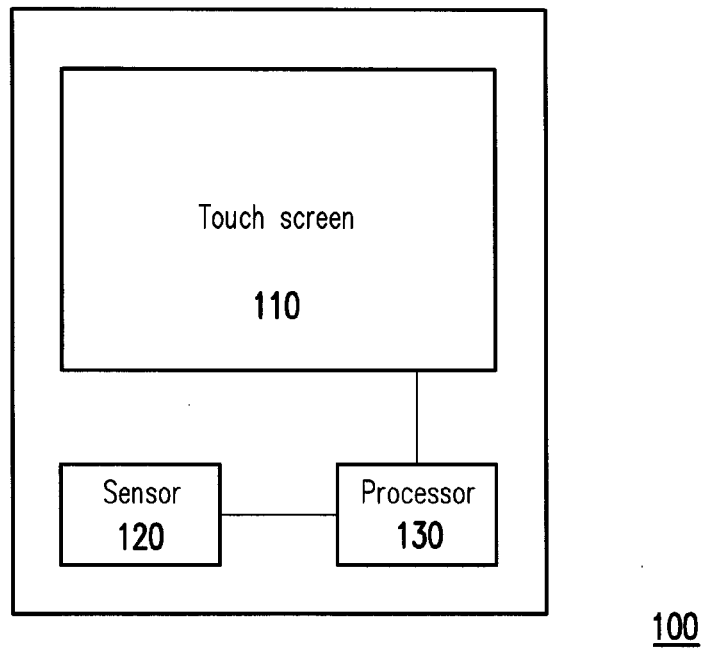
FIG. 1 is a block diagram of a touch device according to an embodiment of the invention.

FIG. 1 is a block diagram of a touch device according to an embodiment of the invention. Referring FIG. 1, a touch device 100 includes a touch screen 110, a sensor 120, and a processor 130. The touch device 100 can be, for instance, a capacitive, a resistive, or an optical touch device, and can also be an electronic device (such as a mobile phone, a tablet computer, or a notebook computer) having a capacitive, a resistive, or an optical touch module. However, the touch device 100 of the embodiments of the invention is not limited thereto.

The user can perform a gesture such as a tap, a slide, a drag, a double tap, or a hold on the touch screen 110 in the touch device 100, and can also perform the actions with the application of a multi-finger function. A program or an operating system in the touch device 100 can generate a corresponding operation (such as moving a cursor, selecting an object, enlarging a window, or closing a window) through the operation of the user. In general, when the user holds an electronic device having a touch screen with a slim border with a hand, part of the palm may be in contact with the touch screen, thereby causing the electronic device to misjudge the touch operation of the user. Therefore, to prevent the occurrence of an accidental touch by the user, in the embodiments of the invention, the touch screen can be configured for touchable regions and untouchable regions according to the operating condition of the user (such as the location of the hand holding the electronic device or the program opened) to facilitate the touch operation of the user.

The touch screen 110 can be a display (such as a liquid crystal display (LCD) or an organic electro-luminescent display (OLED)) having a touch function (touch techniques such as capacitive, resistive, or optical). In the present embodiment, the touch screen 110 is conformed to the slim border design. In other embodiments, the touch screen 110 can also be designed to have a conventional border width. The border design of the touch screen 110 in the embodiments of the invention is not limited thereto.

The sensor 120 can include at least one sensor such as a photoelectric sensor, a capacitance type proximity sensor, a magnetic type proximity sensor, and an infrared light proximity sensor for detecting whether an operating object (such as a hand) is present. The sensor can be disposed in front, behind, or on a side of the electronic device.

The processor 130 is coupled to the sensor 120 and the touch screen 110. The processor 130 can be a central processing unit (CPU) or a programmable microprocessor, a digital signal processor (DSP), a programmable controller, an application specific integrated circuit (ASIC), or other similar elements or a combination thereof for general use or special use. In the present embodiment, the processor 130 is used to process all tasks of the touch device 100 of the present embodiment.

Figure 2:
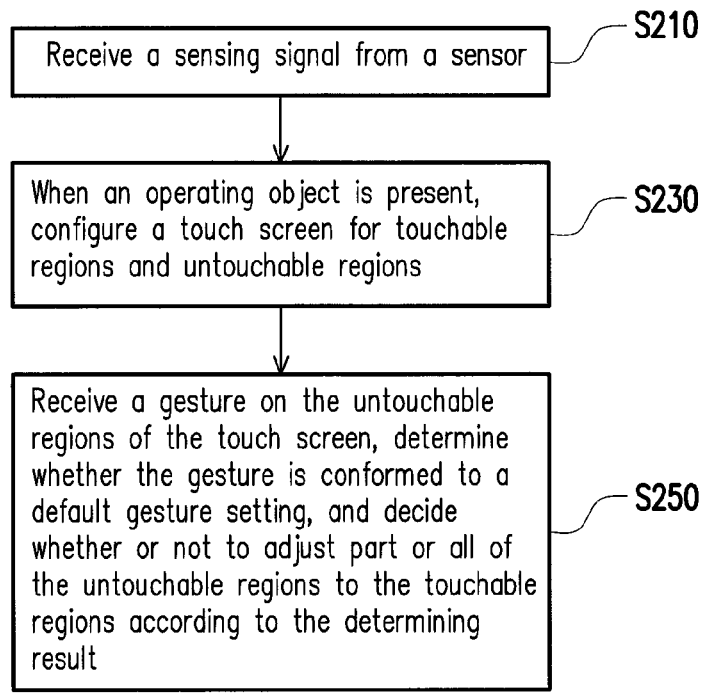
FIG. 2 is a flow chart of a control method of a touch device according to an embodiment of the invention.

FIG. 2 is a flow chart of a control method of the touch device 100 according to an embodiment of the invention. Referring to FIG. 2, the control method of the present embodiment is suitable for the touch device 100 of FIG. 1. In the following, the control method of the embodiments of the invention is described with each of the elements in the touch device 100. Each of the processes of the present method can be adjusted according to embodiment conditions and is not limited thereto.

Figure 3A:
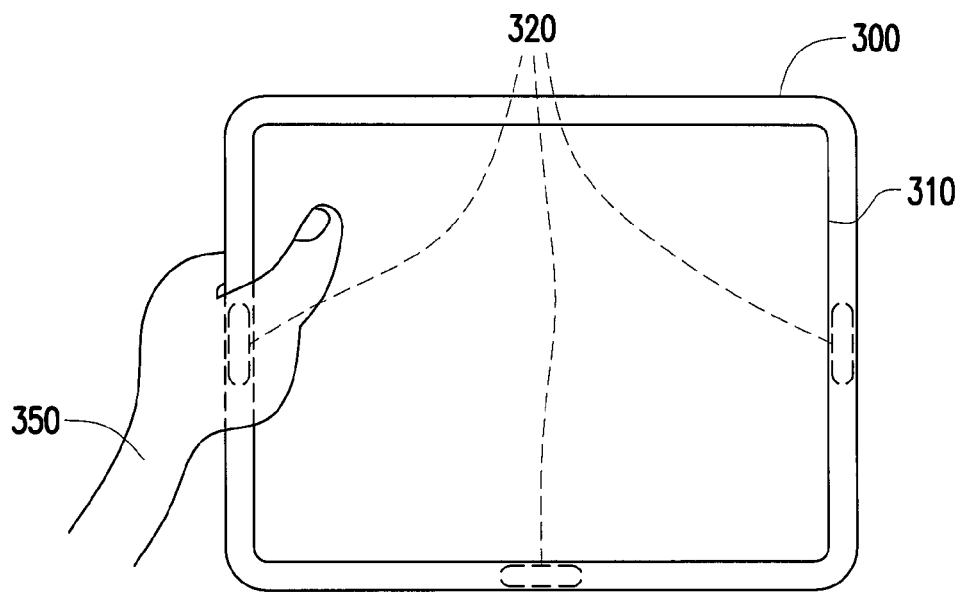
FIG. 3A and FIG. 3B are schematic diagrams of a user holding a touch device with a hand according to an embodiment of the invention.
Figure 3B:
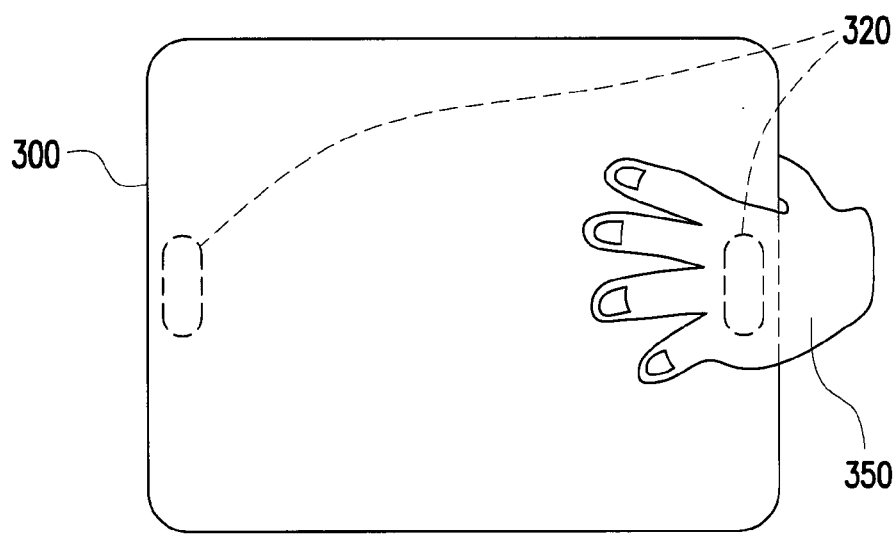

In step S210, the processor 130 receives a sensing signal generated by the sensor 120. For instance, FIG. 3A and FIG. 3B are schematic diagrams of a user holding the touch device 100 with a hand according to an embodiment of the invention. Referring to FIG. 3A, a touch device 300 of FIG. 3A is suitable for the touch device 100 of FIG. 1. A touch screen 310 and a sensor 320 of FIG. 3A respectively correspond to the touch screen 110 and the sensor 120 of FIG. 1, and therefore relevant descriptions thereof are not repeated herein. When the user holds the touch device 300 with a hand 350, the hand 350 covers the sensor 320 and part of the hand 350 is also in contact with the touch screen 310 at the same time. The sensor 320 senses the approach of the hand 350 and generates a sensing signal, and then sends the sensing signal to the processor 130.

Referring to FIG. 3B, the touch device 300 in FIG. 3B is as described for FIG. 3A and is not repeated herein. When the user holds the touch device 300 with the hand 350, the hand 350 covers the sensor 320. The sensor 320 senses the approach of the hand 350 and generates a sensing signal, and then sends the sensing signal to the processor 130. However, the shape, size, location, and number of the sensor 320 shown in FIGS. 3A and 3B are only exemplary. In other embodiments, the sensor 320 can also have different a shape, size, location, and number, and the sensor 320 of the embodiments of the invention is not limited thereto. In other words, the shape, size, location, and number of the sensor 320 can be adjusted according to the embodiments of the invention.

Referring to FIG. 2, in step S230, when an operating object is present, the processor 130 configures the touch screen 110 for touchable regions and untouchable regions. In particular, the untouchable regions cannot generate a response through a touch by the operating object. Specifically, the processor 130 can learn whether an operating object is present according to the sensing signal generated by the sensor 120 in step S210. After the processor 130 determines an operating object is present, the processor 130 configures the touch screen 110 for touchable regions and untouchable regions. In particular, when the user inputs a gesture (such as a click, a slide, or a long press) on the untouchable regions with the operating object (such as a finger or a stylus), the processor 130 does not respond to the gesture input by the user to execute the original corresponding operation (for instance, a clicking gesture corresponds to a click operation, and a sliding gesture corresponds to an operation of moving an object).

In an embodiment, the processor 130 increases the capacitance threshold of the untouchable regions in the touch device 100. That is, the capacitance variation generated by the operating object touching the touch screen 110 needs to be greater than the original such that the processor 130 can determine the operating object touches the touch screen 110. In other embodiments, the processor 130 can also not display an image on the untouchable regions of the touch screen 110 to let the user know the location and the size of the untouchable regions.

Figure 4A:
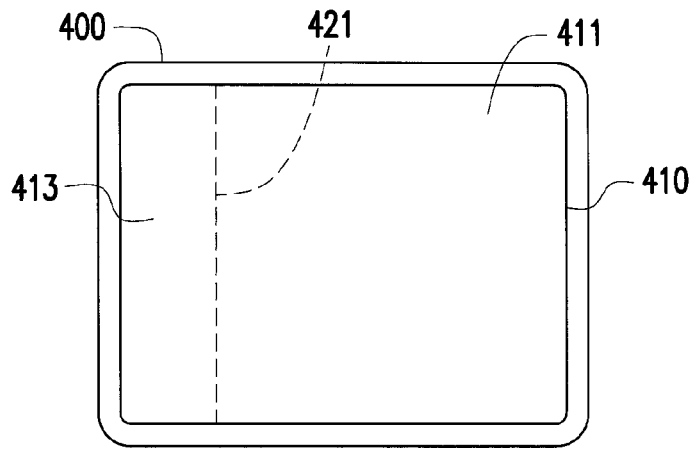
FIG. 4A to FIG. 4C are schematic diagrams of touchable regions and untouchable regions according to an embodiment of the invention.
Figure 4B:
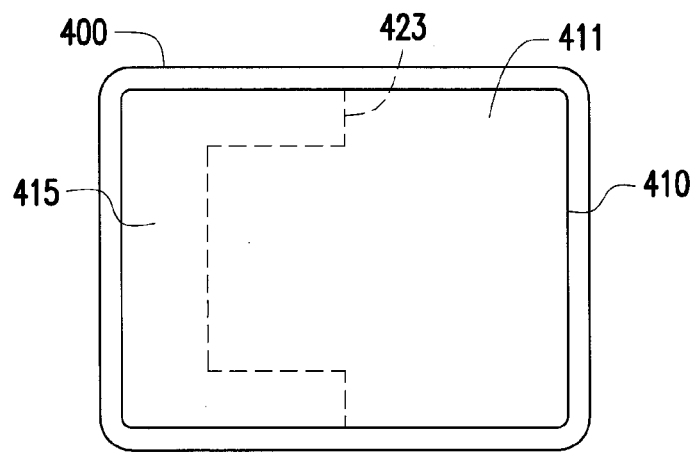
Figure 4C:
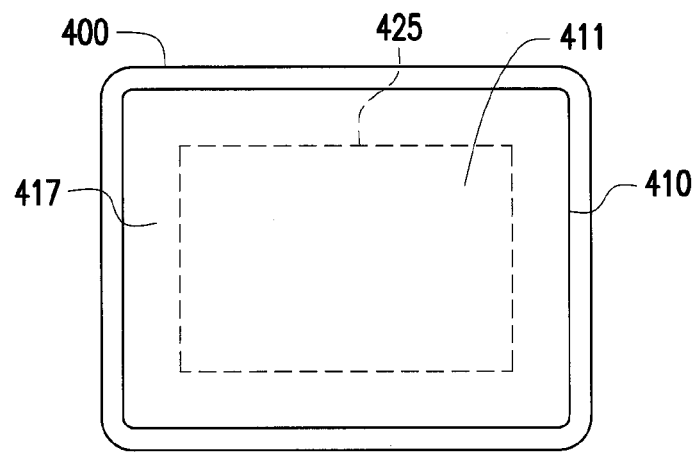

In an embodiment, the processor 130 adjusts the untouchable regions to one of at least one side adjacent to the touchable regions, at least one half of a circumference, and a circumference. For instance, FIG. 4A to FIG. 4C are schematic diagrams of touchable regions and untouchable regions according to an embodiment of the invention. A touch device 400 in FIG. 4A is suitable for the touch device 100 of FIG. 1. In particular, a touch screen 410 corresponds to the touch screen of FIG. 1, and therefore relevant descriptions are not repeated herein. Referring to FIG. 4A first, the touch screen 410 is configured for a touchable region 411 and an untouchable region 413 with a dash line 421. When the user holds the touch device 400 (for instance, the hand 350 in FIG. 3A holds the touch device 300) with a hand, since the untouchable regions cannot generate a response through the touch by the operating object, in the handheld condition in FIG. 3A, the touch device 400 does not execute the corresponding operation (such as a click operation).

Referring to FIG. 4B, the touch device 400 in FIG. 4B is as described for FIG. 4A and is not repeated herein. The difference between the present embodiment and the above example is, in the left half of the touch screen 410, an untouchable region 415 is located in the periphery of the touchable region 411. Referring to FIG. 4C, the touch device 400 in FIG. 4C is as described for FIG. 4A and is not repeated herein. The difference between the present embodiment and the above examples is, in the touch screen 410, an untouchable region 417 is located in the periphery of the touchable region 411. However, the touchable region 411 and the untouchable regions 413-417 shown in FIG. 4A to FIG. 4C are only exemplary. In other embodiments, the touchable regions and the untouchable regions may have different shapes, sizes, and numbers.

Accordingly, when the user holds the touch device of the embodiments of the invention with a hand, the occurrence of an accidental touch on the touch screen by part of the palm can be prevented, such that the touchable regions in the touch device can still maintain normal function for the user to operate.

Referring to FIG. 2, in step S250, a gesture is received in the untouchable regions of the touch screen 110 (such as the untouchable region 413 in FIG. 4A to FIG. 4C), and the processor 130 determines whether the gesture is conformed to a default gesture setting and decides whether or not to adjust part or all of the untouchable regions to the touchable regions (such as the touchable region 411 in FIG. 4A to FIG. 4C) according to the determining result. For instance, the capacitance threshold of the corresponding untouchable regions is reduced.

Specifically, although the untouchable regions cannot generate a response through a touch by the operating object, the touch screen 110 still continues to receive the gesture of the operating object and sends the gesture to the processor 130, such that the processor 130 determines whether the gesture received is conformed to the default gesture setting. In an embodiment, the default gesture setting includes default gestures, and an execution time and an area of the untouchable regions touched by the operating object corresponding to each of the default gestures. The processor 130 determines whether the gesture received is conformed to the default gestures and the execution time and the area corresponding to each thereof.

In an embodiment, the default gestures include a successive tapping gesture, and the processor 130 determines whether the gesture received is conformed to the number of successive tapping of the successive tapping gesture and the execution time (such as successively tapping twice in one second) and the area (such as an area of less than 3 square centimeters of the touch screen 110 touched by the operating object) corresponding to the successive tapping gesture. In another embodiment, the default gestures include a long press operation, and the processor 130 determines whether the gesture received is conformed to the long press operation and the execution time (such as long pressing no more than six seconds) and the area (such as an area of less than 4 square centimeters of the touch screen 110 touched by the operating object) corresponding to the long press gesture.

When the processor 130 determines the gesture received is conformed to the default gesture setting according to the above examples, the processor 130 decides whether to adjust part or all of the untouchable regions corresponding to a first location of the gesture received to the touchable regions according to the first location.

Figure 5A:
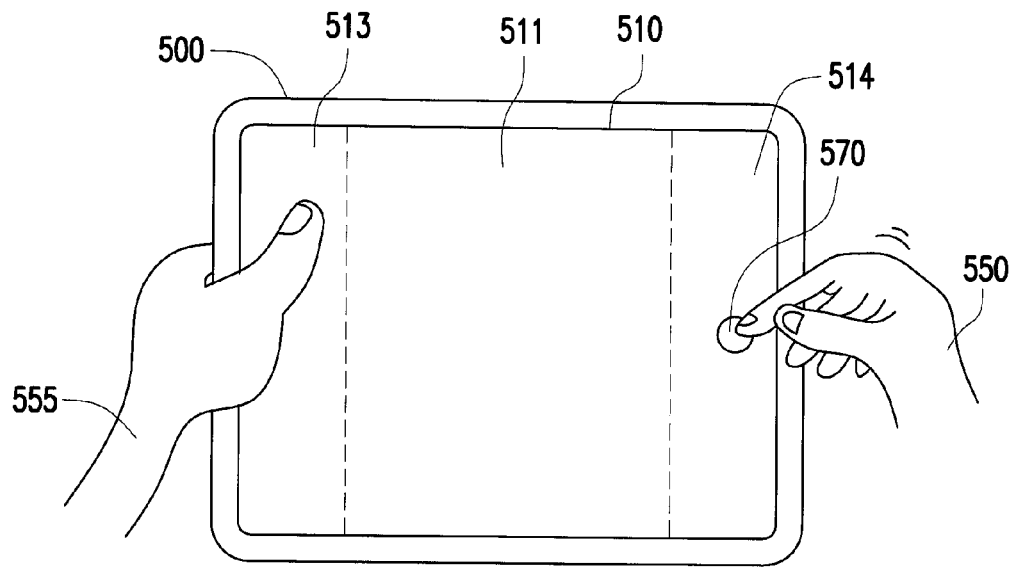
FIG. 5A and FIG. 5B are schematic diagrams of a successive tapping operation according to an embodiment of the invention.
Figure 5B:
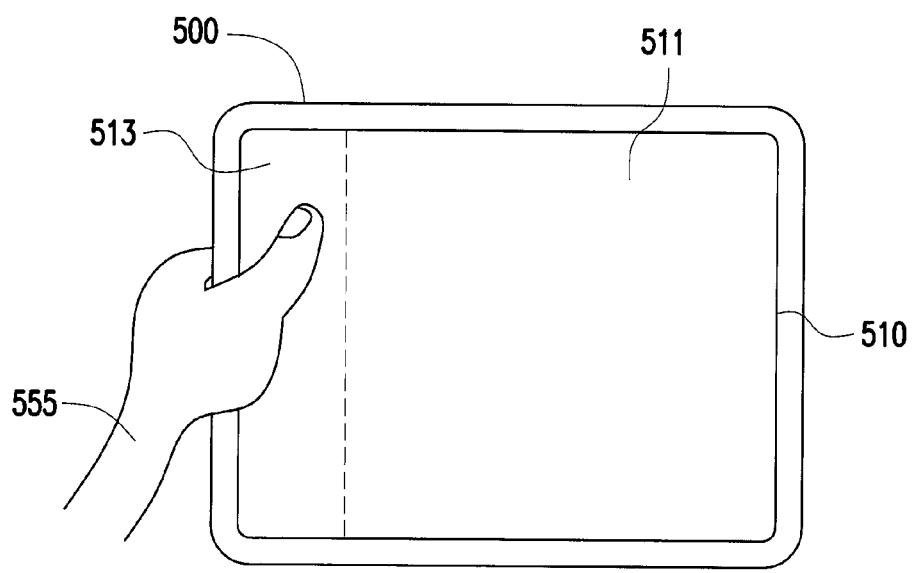

For instance, FIG. 5A and FIG. 5B are schematic diagrams of a successive tapping operation according to an embodiment of the invention. The elements, a touchable region 511, and untouchable regions 513 and 514 in a touch device 500 in FIG. 5A and FIG. 5B are as described for FIG. 1 and FIG. 4A to FIG. 4C and are not repeated herein. Referring to FIG. 5A first, the user successively taps (such as successively tapping 5 times in 2 seconds) a location 570 (such as an area of 2 square centimeters) in the untouchable region 514 with a hand 550, and the processor 130 of the touch device 500 determines the gesture input by the user is a successive tapping gesture, and that the number of successive tapping, the execution time, and the area are conformed to the default gesture setting (for instance, successively tapping 2 times in one second and the contact area is less than 3 square centimeters). Referring to FIG. 5B, the processor 130 of the touch device 500 adjusts the untouchable region 514 to the touchable region 511, and the untouchable region 513 remains unchanged. A hand 555 can continue to hold the touch device 500, and the touch device 500 does not generate a response to the touch.

Figure 6A:
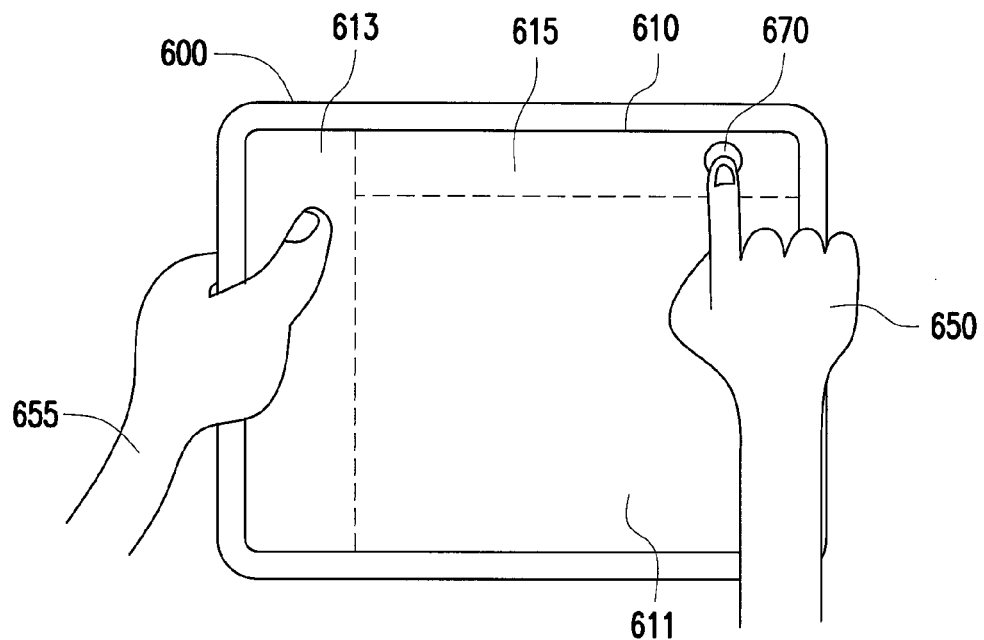
FIG. 6A and FIG. 6B are schematic diagrams of a long press operation according to an embodiment of the invention.
Figure 6B:
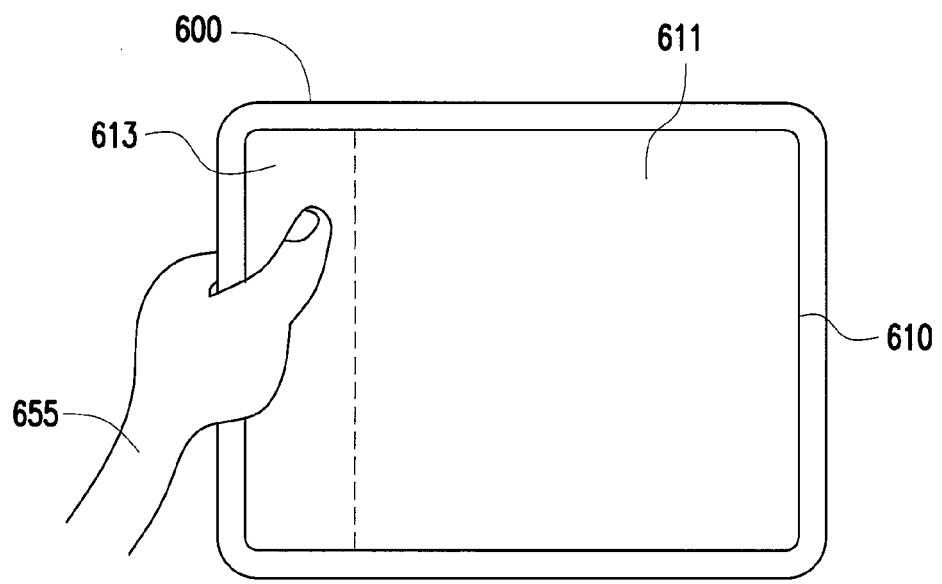

With regard to the long press operation, FIG. 6A and FIG. 6B are schematic diagrams of a long press operation according to an embodiment of the invention. The elements, a touchable region 611, and untouchable regions 613 and 615 in a touch device 600 in FIG. 6A and FIG. 6B are as described for FIG. 1 and FIG. 4A to FIG. 4C and are not repeated herein. Referring to FIG. 6A first, the user long presses (such as long pressing for 2 seconds) a location 670 (such as an area of 3 square centimeters) in an untouchable region 615 with a hand 650, and the processor 130 of the touch device 600 determines the gesture input by the user is a long press gesture, and that the number of successive tapping and the area are conformed to the default gesture setting (for instance, successively tapping 2 times in one second and the contact area is less than 4 square centimeters). Referring to FIG. 6B, the processor 130 of the touch device 600 adjusts the untouchable region 615 to the touchable region 611, and the untouchable region 613 remains unchanged. A hand 655 can continue to hold the touch device 600, and the touch device 600 does not generate a response to the touch.

Figure 7:
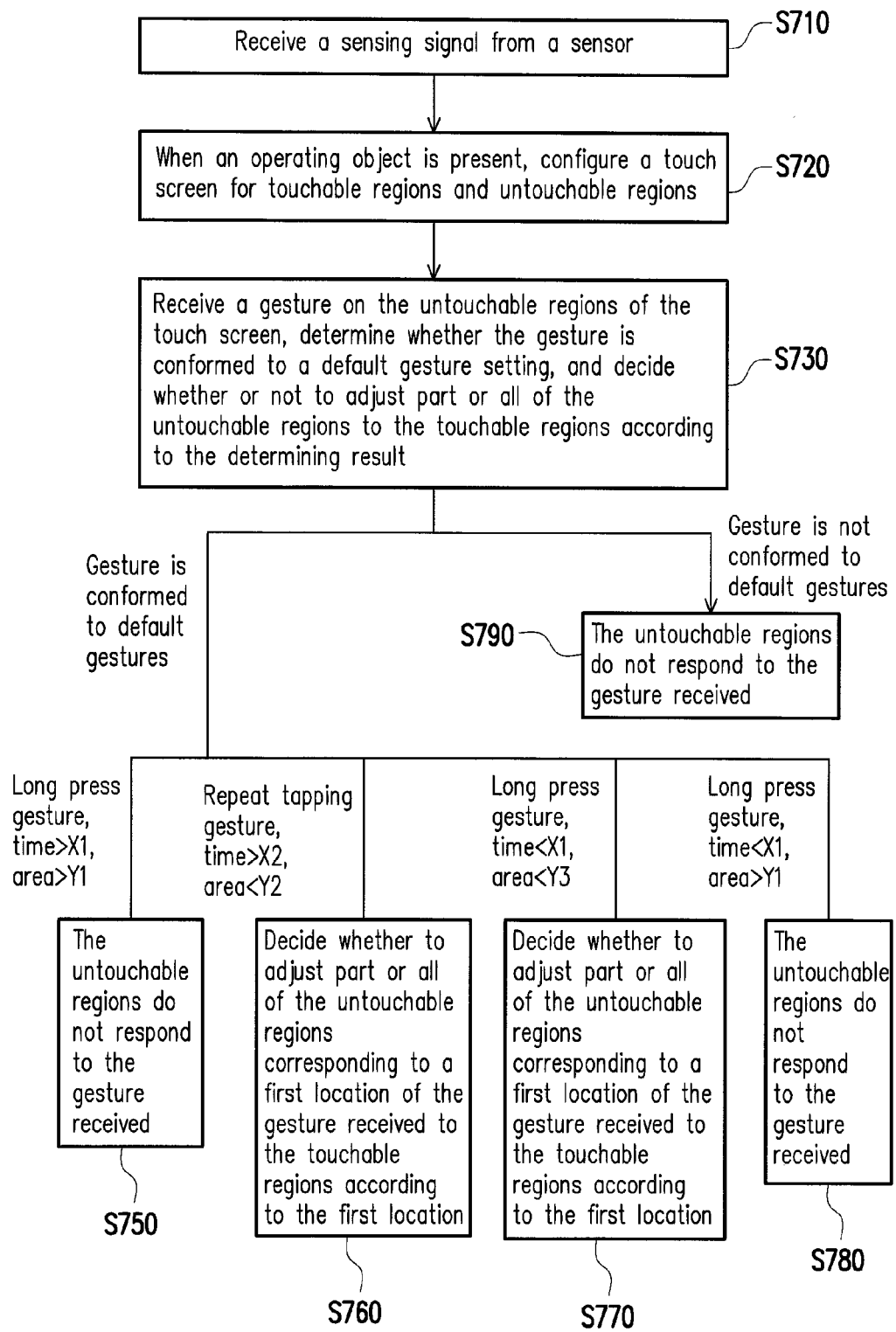
FIG. 7 is a flow chart of a control method of a touch device according to another embodiment of the invention.

In an embodiment, the default gesture setting includes a plurality of default gestures. The processor 130 in FIG. 1 can also determine a plurality of default gestures. For instance, FIG. 7 is a flow chart of a control method of a touch device 100 according to another embodiment of the invention. Referring to FIG. 7, the control method of the present embodiment is suitable for the touch device 100 of FIG. 1. In the following, the control method of the embodiments of the invention is described with each of the elements in the touch device 100. Each of the processes of the present method can be adjusted according to embodiment conditions and is not limited thereto.

Steps S710, S720, and S730 in FIG. 7 respectively correspond to steps S210, S230, and S250 in FIG. 2, and therefore relevant descriptions are not repeated herein. When the gesture received is conformed to the default gestures (such as the successive tapping gesture and the long press gesture), the processor 130 decides whether to adjust the untouchable regions according to the type of the gesture, the execution time, and the size of the contact area of the operating object.

When the gesture received is a long press gesture, and the time of the long press is greater than X1 and the contact area of the operating object is greater than Y1, the untouchable regions do not respond to the gesture received (step S750). In particular, X1 and Y1 are positive values. When the gesture received is a successive tapping gesture, and the time of the long press is greater than X2 and the contact area of the operating object is less than Y2, the processor 130 decides whether to adjust part or all of the untouchable regions corresponding to a first location of the gesture received to the touchable regions according to the first location (step S760). Detailed descriptions are as presented for FIG. 5A and FIG. 5B. In particular, X2 and Y2 are positive values. When the gesture received is a long press gesture, and the time of the long press is less than X1 and the contact area of the operating object is less than Y3, the processor 130 decides whether to adjust part or all of the untouchable regions corresponding to a first location of the gesture received to the touchable regions according to the first location (step S770). Detailed descriptions are as presented for FIG. 6A and FIG. 6B. In particular, Y3 is a positive value. When the gesture received is a long press gesture, and the time of the long press is less than X1 and the contact area of the operating object is greater than Y1, the untouchable regions do not respond to the gesture received (step S780). Moreover, when the gesture received is determined to be not conformed to the default gestures in step S730, the untouchable regions also do not respond to the gesture received (step S790).

In the above embodiments, the processor 130 can determine whether the gesture received is a successive tapping gesture or a long press operation to decide whether to adjust the untouchable regions. In other embodiments, the processor 130 can also determine whether the user input a sliding gesture on the untouchable regions to adjust the untouchable regions.

Figure 8A:
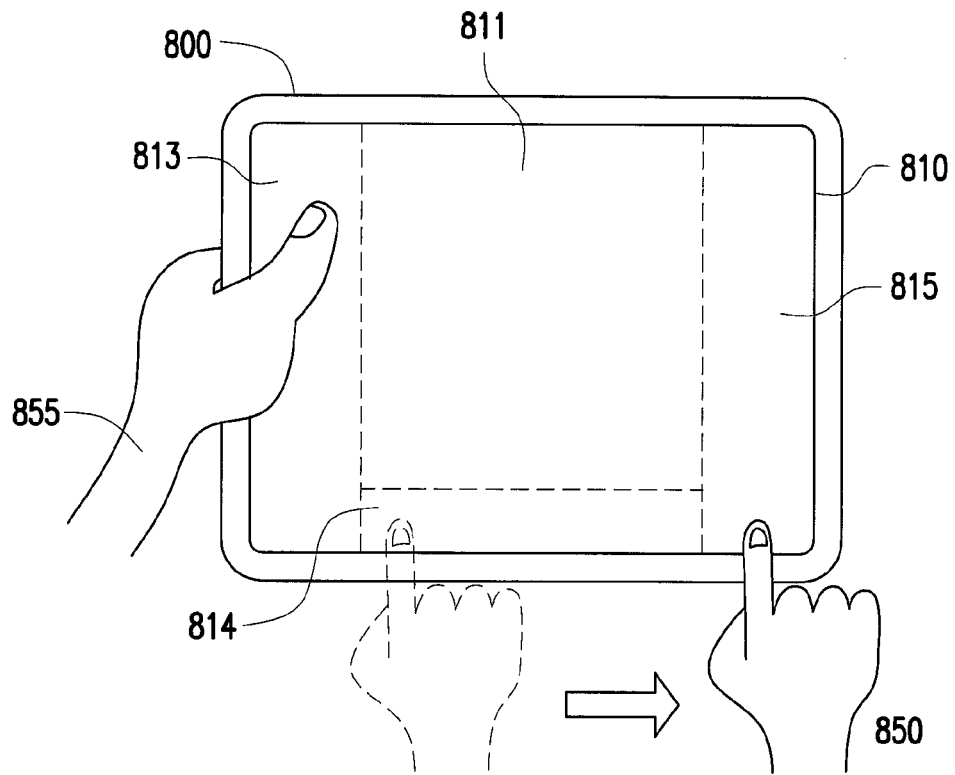
FIG. 8A and FIG. 8B are schematic diagrams of a sliding operation according to an embodiment of the invention.
Figure 8B:
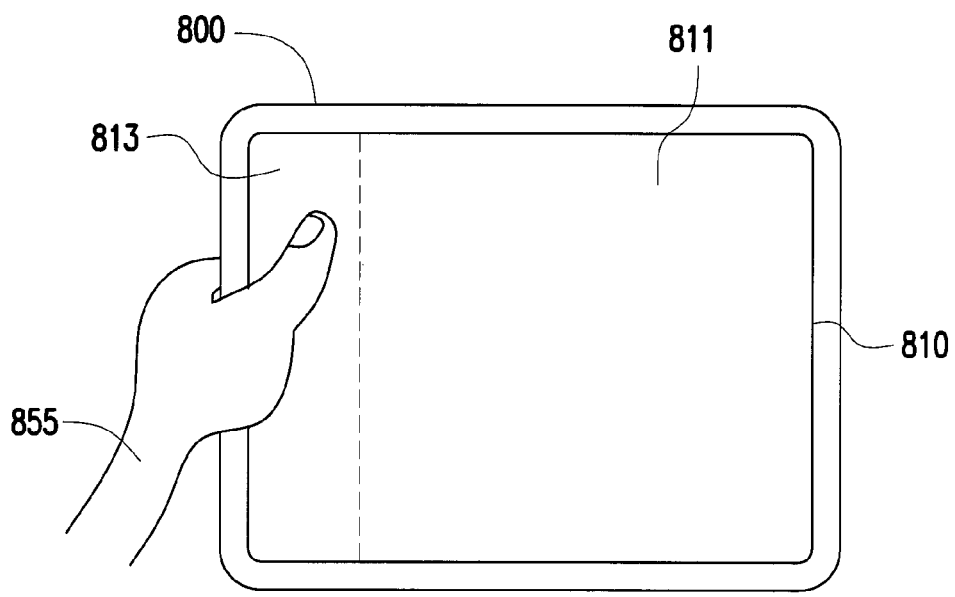

For instance, FIG. 8A and FIG. 8B are schematic diagrams of a sliding operation according to an embodiment of the invention. The elements, a touchable region 811, and untouchable regions 813, 814, and 815 in a touch device 800 in FIG. 8A and FIG. 8B are as described for FIG. 1 and FIG.

4A to FIG. 4C and are not repeated herein. Referring to FIG. 8A first, the user touches the untouchable regions with a hand 850 and slides the hand 850 from left to right. The processor 130 of the touch device 800 determines whether the gesture input by the user is conformed to a default gesture setting. In the present embodiment, the default gesture setting includes a sliding operation, and a movement direction and a distance of the sliding operation. The processor 130 of the touch device 800 determines whether the gesture is conformed to the sliding operation and the movement direction (such as left to right or right to left) and the distance (such as no more than thirty centimeters) of the sliding operation. When the processor 130 of the touch device 800 determines the gesture input by the user is a sliding operation, referring to FIG. 8B, the processor 130 of the touch device 800 decides to adjust the untouchable region 814 and 815 to the touchable region 811 according to the movement direction and the distance of the gesture received, and the untouchable region 813 remains unchanged. A hand 855 can continue to hold the touch device 800, and the touch device 800 does not generate a response to the touch.

Moreover, in an embodiment, the processor 130 of the touch device 100 of FIG. 1 further generates a prompt message on the touch screen 110 to confirm whether or not to adjust part or all of the untouchable regions to the touchable regions. For instance, the selections "yes" and "no" are displayed in the prompt message for the user to confirm. When the user selects "yes", the processor 130 of the touch device 100 adjusts the corresponding untouchable regions to the touchable regions. When the user selects "no", the settings of the untouchable regions remain the same.

In the embodiments of FIG. 5A and FIG. 5B, FIG. 6A and FIG. 6B, and FIG. 8A and FIG. 8B, one or a plurality of untouchable regions on a side (such as the untouchable region 514) is adjusted to the touchable regions (such as the touchable region 511). In other embodiments, the untouchable regions in the above embodiments can also be configured for a plurality of subregions, which is described in an embodiment below.

Figure 9:
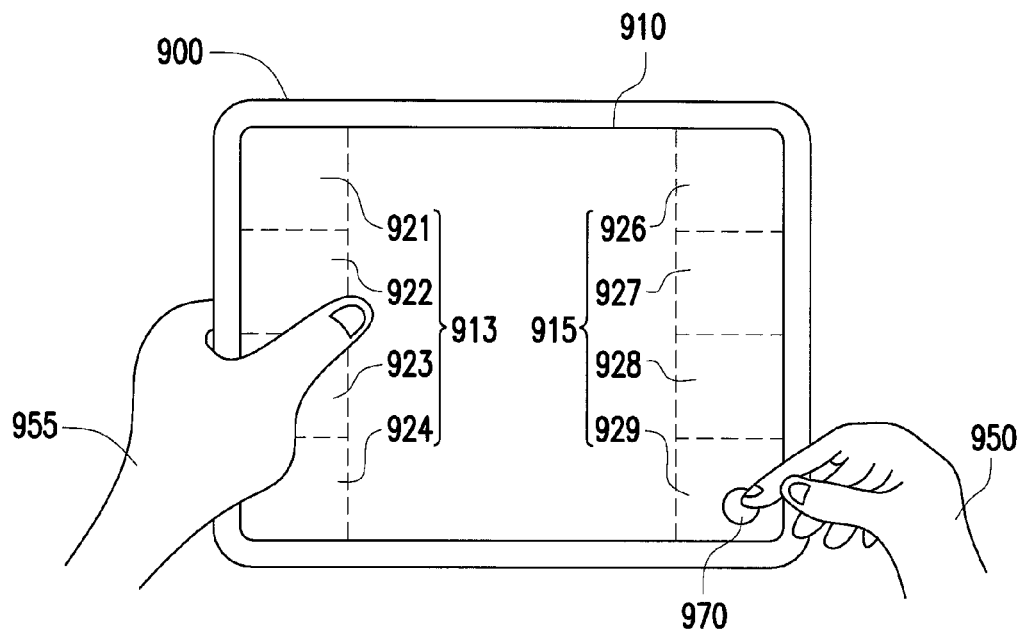
FIG. 9 is a schematic diagram of subregions according to an embodiment of the invention.

FIG. 9 is a schematic diagram of subregions according to an embodiment of the invention. The elements, a touchable region 911, and untouchable regions 913 and 915 in a touch device 900 in FIG. 9 are as described for FIG. 1 and FIG. 4A to FIG. 4C and are not repeated herein. Referring to FIG. 9, the processor 130 of the touch device 900 respectively configures the untouchable regions 913 and 915 for subregions 921-924 and 926-929. The processor 130 of the touch device 900 detects a location 970 touched by the gesture (such as the long press gesture) input by the user, and adjusts the subregion 929 corresponding to the location 970 to the touchable region 911.

In the embodiments above, whether to adjust the untouchable regions to the touchable regions is decided according to the gesture input by the user. In other embodiments, the touch device 100 in FIG. 1 can also determine the program opened to decide whether to adjust the untouchable regions.

Figure 10:
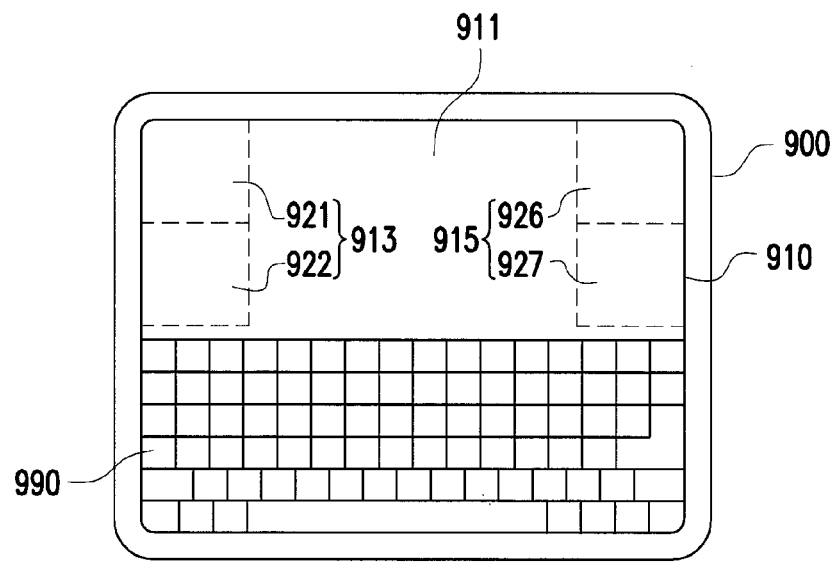
FIG. 10 is an example of a decision made by a program according to an embodiment of the invention.

For instance, FIG. 10 is an example of a decision made by a program according to an embodiment of the invention. Referring to FIG. 9 and FIG. 10, the elements in FIG. 10 having the same reference numerals as the elements in FIG. 9 are as described for FIG. 9 and are not repeated herein. The processor 130 of the touch device 900 in FIG. 10 further determines whether to open a program. In FIG. 10, a virtual keyboard 990 is executed. The processor 130 of the touch device 900 in FIG. 10 adjusts the subregions (923, 924, 928, and 929 in FIG. 9) to the touchable region 911 according to the virtual keyboard 990.

In other embodiments, the virtual keyboard 990 opened in FIG. 10 can also be other programs (such as a game or a word processor), and the processor 130 of the touch device 900 can adjust subregions corresponding to different programs according to the different programs. Accordingly, by determining the program opened and adjusting the untouchable regions, the time needed for the user to input a gesture can be reduced.

Based on the above, the touch device and the control method thereof of the embodiments of the invention determine whether an operating object is present, configures a touch screen of the touch device for touchable regions and untouchable regions according to the determining result, and determines whether or not to adjust part or all of the untouchable regions to the touchable regions according to a gesture input by the user. Accordingly, the user can more conveniently operate the touch screen having a slim border design, as the occurrence of an accidental touch is prevented.

Although the invention has been described with reference to the above embodiments, it will be apparent to one of the ordinary skill in the art that modifications to the described embodiments may be made without departing from the spirit of the invention. Accordingly, the scope of the invention is defined by the attached claims not by the above detailed descriptions.

What is claimed is:

1. A control method of a touch device, wherein the touch device comprises a touch screen and at least one sensor, the at least one sensor disposed in front, behind or on a side of the touch device and adjacent to periphery of the touch device, and the control method comprises:
   receiving a sensing signal from the at least one sensor to detect whether an operating object covers at least one sensor;
   when an operating object covers at least one sensor, the touch screen is configured for at least one touchable region and at least one untouchable region, wherein the at least one untouchable region cannot generate a response through a touch by the operating object, and the at least one untouchable region is located in periphery of the touch screen; and
   receiving a gesture on the at least one untouchable region, and determining whether the gesture is conformed to a default gesture setting to decide whether or not to adjust part or all of the at least one untouchable region to the at least one touchable region,
   wherein the default gesture setting comprises a sliding operation, wherein when the gesture is the sliding operation, only at least one first untouchable region of the at least one untouchable region overlapping a movement of the sliding operation is adjusted to the at least one touchable region.

2. The control method of claim 1, wherein the default gesture setting comprises at least one default gesture and an execution time and an area of the at least one untouchable region touched by the operating object corresponding to each of the at least one default gesture, and the step of determining whether the gesture is conformed to the default gesture setting comprises:
   determining whether the gesture is conformed to one of the at least one default gesture and the execution time and the area corresponding thereto; and deciding whether to adjust part or all of the at least one untouchable region corresponding to a first location of the gesture to the at least one touchable region according to the first location.

3. The control method of claim 2, wherein the at least one default gesture comprises a successive tapping gesture, and, the step of determining whether the gesture is conformed to one of the at least one default gesture and the execution time and the area corresponding thereto comprises:
determining whether the gesture is conformed to a number of successive tapping of the successive tapping gesture and the execution time and the area corresponding to the successive tapping gesture.

4. The control method of claim 2, wherein the at least one default gesture comprises a long press operation, and, the step of determining whether the gesture is conformed to one of the at least one default gesture and the execution time and the area corresponding thereto comprises:
determining whether the gesture is conformed to the long press operation and the execution time and the area corresponding to the long press gesture.

5. The control method of claim 1, wherein the default gesture setting further comprises a movement direction and a distance of the sliding operation, and, the step of determining whether the gesture is conformed to a default gesture setting to decide whether or not to adjust part or all of the at least one untouchable region to the at least one touchable region comprises:
determining whether the gesture is conformed to the sliding operation and the movement direction and the distance of the sliding operation; and
deciding whether to adjust part or all of the at least one untouchable region to the at least one touchable region according to the movement direction and the distance of the gesture.

6. The control method of claim 1, wherein the step of determining whether the gesture is conformed to the default gesture setting to decide whether or not to adjust part or all of the at least one untouchable region to the at least one touchable region comprises:
configuring the at least one untouchable region for a plurality of subregions;
detecting a second location touched by the gesture; and
adjusting one of the subregions corresponding to the second location to the at least one touchable region.

7. The control method of claim 6, further comprising, after the step of deciding whether or not to adjust part or all of the at least one untouchable region to the at least one touchable region:
determining whether to open a program;
adjusting part or all of the subregions corresponding to the program to the at least one touchable region according to the program.

8. The control method of claim 1, wherein the step of determining whether the gesture is conformed to the default gesture setting further comprises:
when the gesture is not conformed to the default gesture setting, the at least one untouchable region does not respond to the gesture.

9. The control method of claim 1, wherein the step of configuring the touch screen for the at least one touchable region and the at least one untouchable region when an operating object covers at least one sensor comprises:
increasing a capacitance threshold of the at least one untouchable region in the touch device.

10. The control method of claim 1, wherein the step of configuring the touch screen for the at least one touchable region and the at least one untouchable region when an operating object covers at least one sensor comprises:
adjusting the at least one untouchable region to one of at least one side adjacent to the at least one touchable region, at least one half of a circumference, and a circumference.

11. The control method of claim 1, wherein the step of determining whether the gesture is conformed to the default gesture setting to decide whether or not to adjust part or all of the at least one untouchable region to the at least one touchable region further comprises:
generating a prompt message on the touch screen to confine whether or not to adjust part or all of the at least one untouchable region to the at least one touchable region.

12. A touch device, comprising:
at least one sensor disposed in front, behind or on a side of the touch device and adjacent to periphery of the touch device, for detecting whether an operating object covers the at least one sensor;
a touch screen;
a processor coupled to the at least one sensor and the touch screen for receiving a sensing signal from the at least one sensor, wherein when the operating object covers the at least one sensor, the touch screen is configured for at least one touchable region and at least one untouchable region, the at least one untouchable region cannot generate a response through a touch by the operating object, the at least one untouchable region is located in periphery of the touch screen, a gesture is received on the at least one untouchable region, and whether the gesture is conformed to a default gesture setting is determined to decide whether or not to adjust part or all of the at least one untouchable region to the at least one touchable region,
wherein the default gesture setting comprises a sliding operation, wherein when the gesture is the sliding operation, only at least one first untouchable region of the at least one untouchable region overlapping to a movement of the sliding operation is adjusted to the at least one touchable region.

13. The touch device of claim 12, wherein the default gesture setting comprises at least one default gesture and an execution time and an area of the at least one untouchable region touched by the operating object corresponding to each of the at least one default gesture, and the processor determines whether the gesture is conformed to one of the at least one default gesture and the execution time and the area corresponding thereto, and decides whether to adjust part or all of the at least one untouchable region corresponding to a first location of the gesture to the at least one touchable region according to the first location.

14. The touch device of claim 13, wherein the at least one default gesture comprises a successive tapping gesture, and the processor determines whether the gesture is conformed to a number of successive tapping of the successive tapping gesture and the execution time and the area corresponding to the successive tapping gesture.

15. The touch device of claim 13, wherein the at least one default gesture comprises a long press gesture operation, and the processor determines whether the gesture is conformed to the long press operation and the execution time and the area corresponding to the long press gesture.

16. The touch device of claim 12, wherein the default gesture setting further comprises a movement direction and a distance of the sliding operation, and the processor determines whether the gesture is conformed to the sliding operation and the movement direction and the distance of the sliding operation, and decides whether to adjust part or all of the at least one untouchable region to the at least one touchable region according to the movement direction and the distance of the gesture.

17. The touch device of claim 12, wherein the processor configures the at least one untouchable region for a plurality of subregions, detects a second location touched by the gesture, and adjusts one of the subregions corresponding to the second location to the at least one touchable region.

18. The touch device of claim 17, wherein the processor further determines whether to open a program, and adjusts part or all of the subregions to the at least one touchable region according to the program.

19. The touch device of claim 12, where when the gesture is not conformed to the default gesture setting, the at least one untouchable region does not respond to the gesture.

20. The touch device of claim 12, where the processor increases a capacitance threshold of the at least one untouchable region on the touch screen.

21. The touch device of claim 12, wherein the processor adjusts the at least one untouchable region to one of at least one side adjacent to the at least one touchable region, at least one half of a circumference, and a circumference.

22. The touch device of claim 12, wherein the processor further generates a prompt message on the touch screen to confirm whether or not to adjust part or all of the at least one untouchable region to the at least one touchable region.

* * * * *